United States Patent
Saatchi et al.

(10) Patent No.: US 9,467,821 B1
(45) Date of Patent: Oct. 11, 2016

(54) APPLICATION DATA SYNCING ACROSS MULTIPLE CELLULAR MOBILE COMMUNICATION DEVICES

(75) Inventors: Saeed Saatchi, Middletown, NJ (US); Jesus Ramos, Easton, PA (US); Ning Zhang, Warren, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 707 days.

(21) Appl. No.: 13/156,788

(22) Filed: Jun. 9, 2011

(51) Int. Cl.
*G06F 15/16* (2006.01)
*H04W 4/08* (2009.01)

(52) U.S. Cl.
CPC ..................................... *H04W 4/08* (2013.01)

(58) Field of Classification Search
None
See application file for complete search history.

(56) References Cited

U.S. PATENT DOCUMENTS

| | | | |
|---|---|---|---|
| 7,991,381 B1 | 8/2011 | Dunne et al. | |
| 2008/0168391 A1* | 7/2008 | Robbin et al. | 715/810 |
| 2009/0030995 A1* | 1/2009 | Boudreau et al. | 709/206 |
| 2011/0111786 A1* | 5/2011 | Rao | 455/517 |
| 2011/0264497 A1* | 10/2011 | Clyne | 705/14.17 |
| 2012/0147843 A1* | 6/2012 | Pison et al. | 370/330 |
| 2012/0173356 A1* | 7/2012 | Fan et al. | 705/26.1 |
| 2012/0311014 A1* | 12/2012 | Jindal et al. | 709/202 |

OTHER PUBLICATIONS

U.S. Appl. No. 12/264,492, filed Nov. 4, 2008.
U.S. Appl. No. 12/614,021, filed Nov. 6, 2009.
U.S. Appl. No. 13/157,015, filed Jun. 9, 2011.

* cited by examiner

*Primary Examiner* — Ryan Jakovac

(57) ABSTRACT

An application data synchronization system may include a data storage system and a data synchronization module. The data storage system may store the identity of entities and, for each entity, the identity of a group of cellular communication devices used by the entity and at least one application that has been delivered to at least two of the cellular communication devices in the group. The data synchronization module may detect that an application has changed data while operating in one of the cellular communication devices. The data synchronization module may consult the data storage system to determine whether the application was also delivered to one or more other cellular communication devices within the same entity group and, if so, cause the changed data to be propagated to the one or more other cellular communication devices within the same entity group.

20 Claims, 3 Drawing Sheets

APPLICATION DATA SYNCING ACROSS MULTIPLE CELLULAR MOBILE COMMUNICATION DEVICES

BACKGROUND

1. Technical Field

This disclosure relates to cellular communication devices that run application programs and to notifications that are delivered to such devices.

2. Description of Related Art

Cellular communication devices, such as mobile phones, can run a variety of application programs. Tablets, PDAs, laptops and other devices can also function as cellular communication devices and can also run a variety of application programs.

A single entity, such as an individual, company, institution, or subdivision of a company or institution, may use different types of cellular communication devices at different times depending upon the application and the circumstances of the entity. For example, the entity might use a mobile phone to send instant messages, but switch to a laptop or tablet when responding to emails.

Still, the entity may wish to have the same applications on different devices. The entity may similarly wish to have the same content, such as the same multimedia files, on different devices. This may provide the entity with the flexibility of using whatever device is currently running to complete all needed tasks. However, this can require the entity to pay the full price to purchase and download each instance of the application or content in each of the different devices, even though the entity might never run more than a single instance of the application or access a single instance of the content at any one time. It can also cause synchronization problems when the entity changes devices. Still further, the elective use of one of several cellular communication devices can result in important notifications being missed or delayed, such as notifications concerning text messages, emails, and phone calls.

SUMMARY

An application data synchronization system may include a data storage system and a data synchronization module. The data storage system may store the identity of entities. For each entity, the data storage system may also store the identity of a group of cellular communication devices used by the entity and at least one application that has been delivered to at least two of the cellular communication devices in the group. The data synchronization module may detect that an application has changed data while operating in one of the cellular communication devices. The data synchronization module may consult the data storage system to determine whether the application was also delivered to other cellular communication devices within the same group and, if so, cause the changed data to be propagated to the other cellular communication devices within the same group to which the application was delivered.

Each entity may own the group of cellular communication devices used by the entity.

At least two of the cellular communication devices within at least one of the groups may be of a different type.

The data synchronization module may cause the change in the data to be propagated on demand and/or on a periodic schedule.

The data storage system may store the data that is changed by the applications in the groups.

At least one application may be a contacts, calendar, map, or navigation application. Correspondingly, the changed data may be contact, calendar, mapping, or navigation data.

The application data synchronization system may include a user interface that allows each entity to change the identity of the group of cellular communication devices used by the entity.

The data storage system may store user-specified options indicating which cellular communication devices in each group the data synchronization module should propagate changed data to. The user interface may receive the user-specified options and store them in the data storage system. The data synchronization module may propagate changed data in conformance with the user-specified options.

The user-specified options may indicate which applications within each group are to be subject to data synchronization. The user interface may receive these user-specified options and store them in the data storage system. The data synchronization module may propagate changed data in conformance with the user-specified options.

The application data synchronization system may include a notification routing module. The notification routing module may detect a notification that is directed to one of the cellular communication devices, determine which cellular communication device is active within the group of cellular communication device to which the notification is directed, and route the notification to the active cellular communication device.

For each entity, the data storage system may store the identity of applications or units of content that have been delivered to at least one of the cellular communication devices in the group. The application data synchronization system may include an application or content delivery module that delivers a requested application or unit of content to a requesting cellular communication device in response to a request for such delivery from the requesting cellular communication device. The application data synchronization system may include a multiple-delivery benefit determination module that determines whether the requested application or unit of content had previously been delivered to a cellular communication device within the group containing the requesting cellular communication device by consulting the data storage system. If so, the multiple-delivery benefit determination module may provide a multi-delivery benefit as a consequence.

The multi-delivery benefit in connection with at least one requested application or unit of content may be a discount from the per-unit price of the application or unit of content or not to charge beyond what was charged for the delivery of the application or unit of content to the first cellular communication device within the group.

The multi-delivery benefit may be based on a stored benefit policy. The stored benefit policy may be different for different applications or units of content.

Non-transitory, tangible, computer-readable media containing a program of instructions may cause a computer system running the program of instructions to perform one or more of the functions described above.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
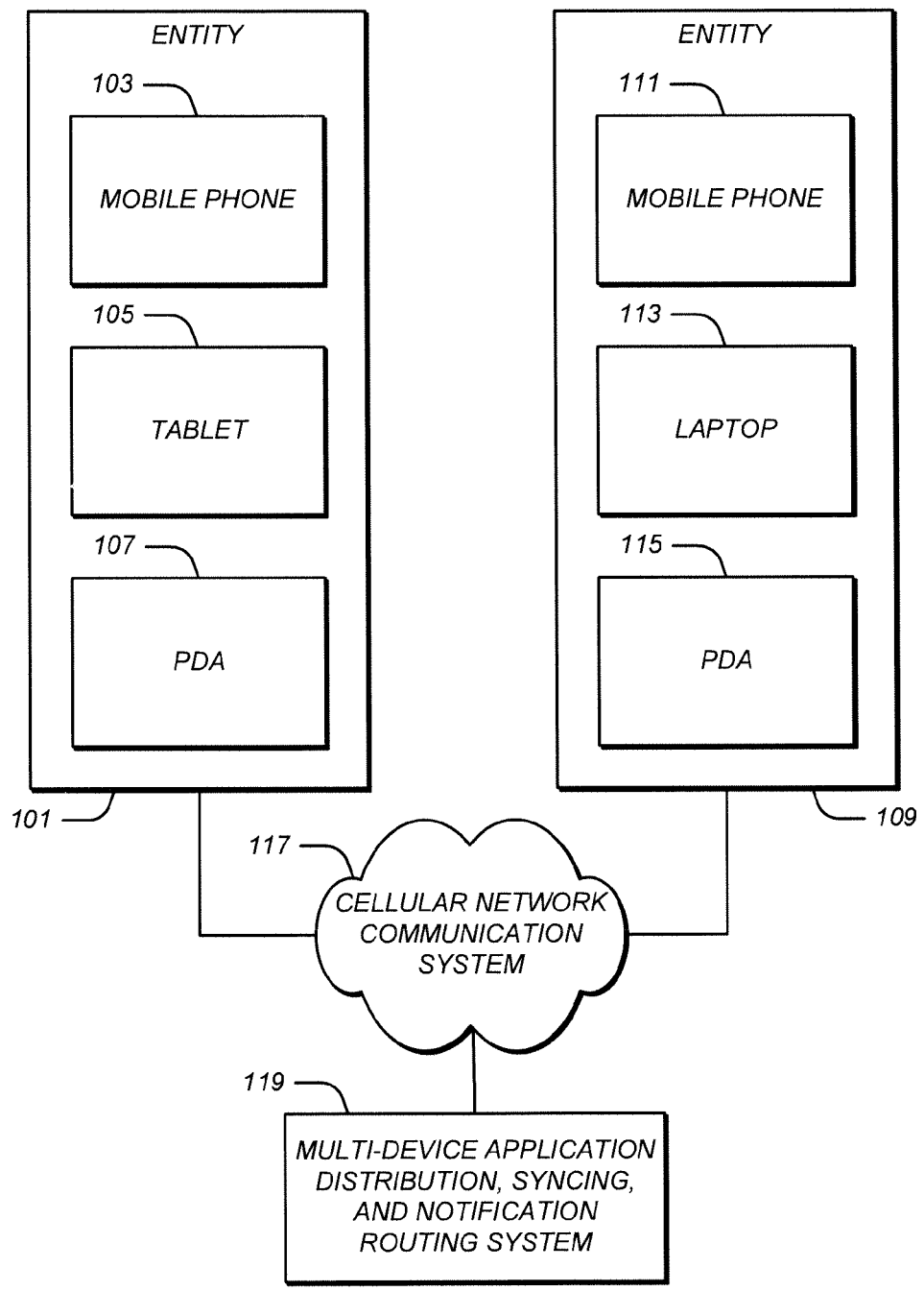
FIG. 1 illustrates a variety of cellular communication devices used by different entities, a network communication system through which these devices can communicate, and a multi-device application, distribution, syncing, and notification routing system.

FIG. 1 illustrates a variety of cellular communication devices used by different entities, a network communication system through which these devices can communicate, and a multi-device application, distribution, syncing, and notification routing system.

As illustrated in FIG. 1, a first entity 101 uses a variety of cellular communication devices, such as a mobile phone 103, a tablet 105, and a PDA 107. Similarly, a second entity 109 uses a variety of cellular communication devices, such as a mobile phone 111, a laptop 113, and a PDA 115. Each entity may also own the devices that it uses. For example, one student may use multiple cellular communications devices, each of which is owned by the parents of the student. Another student may also use multiple cellular communication devices, but may also own these devices.

As illustrated in FIG. 1, the various cellular communication devices that each entity uses may be different. For example, one individual may possess both a mobile phone and a laptop, while another individual may possess both a mobile phone and a tablet. In another example, one entity, a family, may possess multiple mobile phones. Independent of the type of entity, each of the cellular communication devices for each entity is configured to communicate with a cellular network communication system 117.

Each entity may be of any type. For example, an entity may be an individual, a personal group of individuals such as a family, or a professional group of individuals such as an association, a business, or an organization. An entity may also be a subdivision of a business or an organization.

As indicated above under the Description of Related Art, each entity may wish to have the same application and/or content on different devices, thereby providing the entity with the flexibility of using whatever device is currently running to complete all needed tasks. However, this can require the entity to pay full price to purchase and download each instance of the application and/or content, even though the entity might never run the application on or look at the content in more than a single device at any one time. It can also cause synchronization problems when an individual uses the same application in different devices. Still further, an individual may fail to receive an important notification that is directed to one device while the individual is using a different device to which the notification is not directed. Examples of such notifications include notifications of phone calls or text messages prior to delivery of the phone call/text message.

A multi-device application, distribution, synching, and notification routing system 119 is configured to solve at least one of these problems, although not all of these problems may be solved by every embodiment disclosed herein. To effectuate this solution, the multi-device application distribution, synching, and notification routing system 119 is configured to communicate with each of the cellular communication devices through the cellular network communication system 117.

Figure 2:
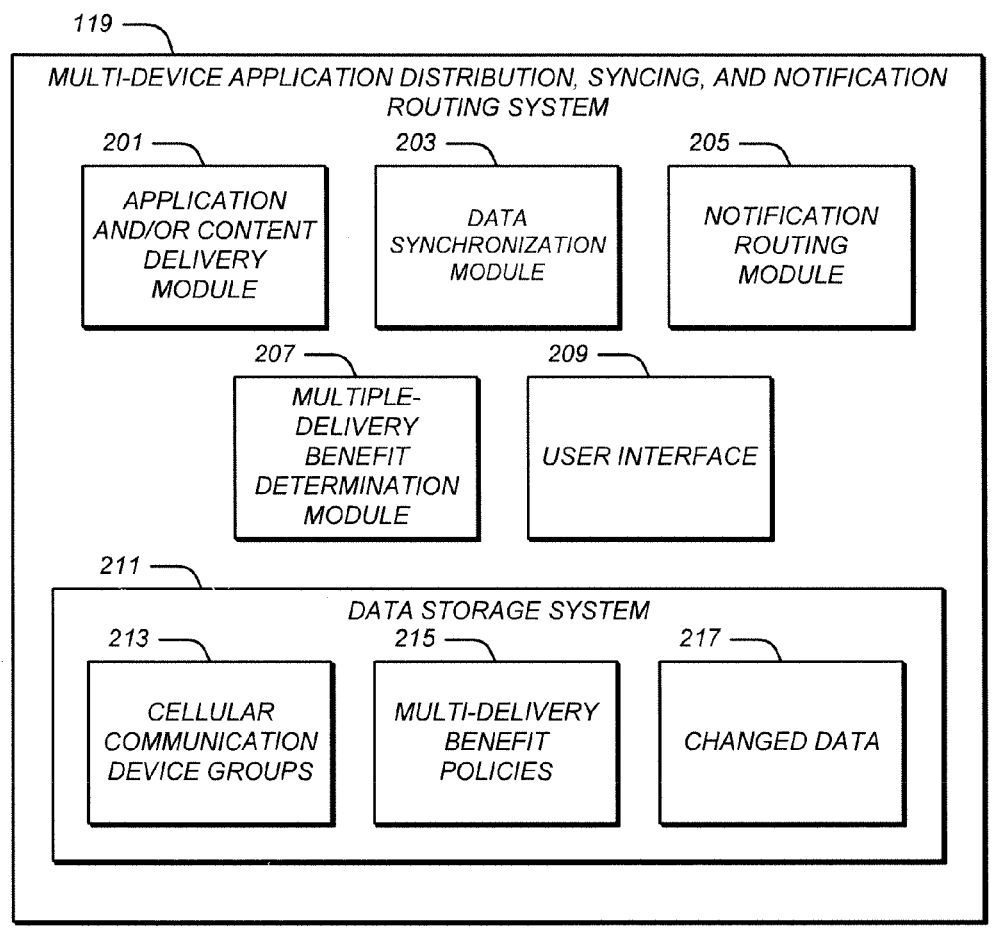
FIG. 2 illustrates an example of the multi-device application distribution, syncing, and notification routing system illustrated in FIG. 1.

FIG. 2 illustrates an example of the multi-device application distribution, syncing, and notification routing system 119 illustrated in FIG. 1. As illustrated in FIG. 2, the multi-device application, distribution, syncing, and notification routing system 119 includes an application and/or content delivery module 201, a data synchronization module 203, a notification routing module 205, a multi-delivery benefit determination module 207, a user interface 209, and a data storage system 211. The data storage system 211 includes information about cellular communication device groups 213, multi-delivery benefit policies 215, and changed data 217. The multi-device application, distribution, syncing, and notification routing system 119 may not include all of these components and/or may include additional components.

Figure 3:
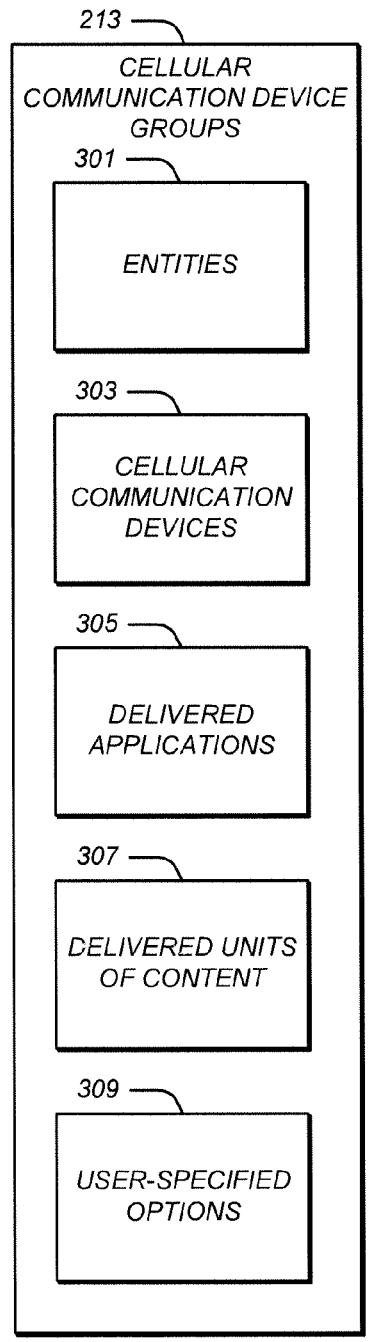
FIG. 3 illustrates an example of the cellular communication device group data illustrated in FIG. 2.

FIG. 3 illustrates an example of the cellular communication device groups 213 data illustrated in FIG. 2. Each cellular communication group is a group of cellular communication devices that are used by the same entity. Each different entity, therefore, has its own cellular communication group. As illustrated in FIG. 3, the information about cellular communication device groups 213 includes information about entities 301, information about cellular communication devices 303, information about delivered applications 305, information about delivered units of content 307, and user-specified options 309. The information about cellular communication device groups 213 may not include all of this information and/or may include additional information.

The information about entities 301 includes information identifying each entity that uses a group of cellular communication devices. The information may be in any form. For example, the information may consist of or include the name of the entity, its address, and/or other information about it.

The information about the cellular communication devices 303 includes information about the cellular communication devices that are used by each of the entities 301, as well as information indicating which entity uses each cellular communication device.

The information about each cellular communication device may be in any form. For example, the information may include a network address of each cellular communication device, such as its mobile device number (MDN). The information may also include information indicative of the type of each cellular communication device, such as whether it is a mobile phone, PDA, laptop, or tablet.

The information about the delivered applications 305 includes information identifying each application that has been delivered to each of the cellular communication devices 303. The information includes an identification of the application and, optionally, other information about the application, such as the date of its delivery, conditions (e.g., date, number of uses) for application license expiration, and/or the amount paid for it.

The delivered applications 305 may be of any type. For example, they may be applications that are configured to run in one or more of the cellular communication devices 303. The delivered applications may include, for example, contact applications, calendar applications, mapping applications, game applications, and/or navigation applications.

The delivered units of content 307 may include information about content that has been delivered to each of the cellular communication devices 303. The information includes an identification of the content and, optionally, other information about the content, such as the date of the delivery, conditions (e.g., date, number of uses) for content license expiration, and/or the payment that was made for it.

The delivered units of content 307 may be content that is used by one or more of the cellular communication devices 303. The delivered units of content 307 may be of any type. For example, the content may be multimedia content, data, images, or any other type of content.

The user-specified options 309 may be of any type. For example, the user specified options 309 may consist of or include an identification of which cellular communication devices 303, delivered applications 305, and/or delivered units of content 307 should be synchronized (as explained in more detail below). The user specified options 309 may also consist of or include an identification of cellular communication devices 303 and which delivered applications 305 should be subject to notification routing (as also explained below).

The user interface 209 is configured to receive the user-specified options 309 from a user. The user interface 209 may also be configured to allow an entity to specify and/or update the list of cellular communication devices indicated in the cellular communication devices 303 as being used by the entity.

The user interface 209 may be of any type. For example, the user interface may consist of or include a keyboard, pointing device, display, touch display, microphone, earphone, loudspeaker, and/or any other type of user interface device. Although being illustrated as part of the multi-device application distribution, syncing, and notification routing system 119, the user interface 209 may be separate from this system. For example, the user interface may be part of a cellular communication device that is being used by an entity and/or part of a desktop or other system which is being used by the entity or another person with its authorization. The user interface 209 may be configured to require each user to be authenticated (e.g., through a user name or password).

Figure 4:
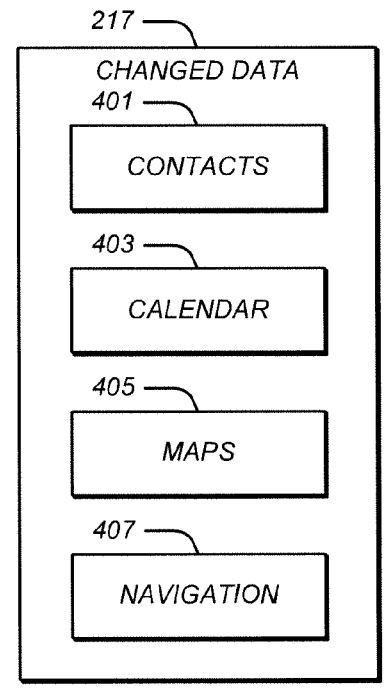
FIG. 4 illustrates an example of the changed data illustrated in FIG. 2.

FIG. 4 illustrates an example of the changed data illustrated in FIG. 2. As illustrated in FIG. 4, the change to data 303 includes contacts data 401, calendar data 403, maps data 405, navigation data 407, and/or any other type of data that may be changed by any of the delivered applications 305 while operating in any of the cellular communication devices 303 or elsewhere. References to "changed data" also include new and deleted data.

Referring back to FIG. 2, the application and/or content delivery module 201 is configured to deliver a requested application or unit of content to a requesting cellular communication device, such as one of the devices illustrated in FIG. 1, in response to a request for this delivery from the requesting cellular communication device.

The multi-delivery benefit determination module 207 is configured to determine whether the requested application or unit of content had previously been delivered to a cellular communication device that is used by the same entity as the requesting cellular communication device. The multi-delivery benefit determination module 207 is configured to do so by consulting the information about the delivered applications 305 for requested application downloads or the delivered units of content 307 for requested units of content downloads. If the multi-delivery benefit determination module 207 determines that a requested application or unit of content had previously been delivered to a cellular communication device within the entity group containing the requesting cellular communication device, the multi-delivery benefit determination module 207 provides a multi-delivery benefit as a consequence.

The multi-delivery benefit may be of any type. For example, it may be a discount from the per-unit price of the requested application or unit of content. The multi-delivery benefit may instead be not to charge beyond what was charged for the delivery of the application or unit of content for the first download within the entity group.

The multi-delivery benefit that is provided by the multi-delivery benefit determination module 207 may depend on one of the stored multi-delivery benefit policies 215. These policies may be different for different applications, for different units of content, for different entities, and/or for different types of cellular communication devices. For example, one policy may provide that an entity should not be charged for subsequent downloads of a contact application, while another policy may provide that the entity should receive a 50% discount for subsequent downloads of a navigation application. Policies may provide for different levels of benefits based on the number of downloads of the same application or unit of content. The content of these policies may be under the control of the vendor of the applications or content and/or any other person.

The application and/or content delivery module 201 is configured to cause information about each application that is downloaded to be stored as part of the delivered applications 305 and information about each downloaded unit of content to be stored as part of the delivered units of content 307. The information that is stored includes an identification of the application or unit of content and the cellular communication device to which it is downloaded. If the cellular communication device is not already listed in the cellular communication devices 303, the application and/or content delivery module 201 may be configured to add this information to the cellular communication devices 303 with or without user approval.

For example, a user may like to use a particular application on many devices. However, the user may not use the same application on more than any one device at the same time and therefore would prefer to receive some recognition of this fact, such as a subscription discount. The multiple-delivery benefit determination module 207 and the multi-delivery benefit polices enable a carrier to provide this benefit, thus improving customer loyalty. This approach also enables a consolidated bill to be prepared, since all of the downloads to the different devices are linked together by the information about the cellular communication device groups 213.

The data synchronization module 203 is configured to detect that an application has changed data while operating in one of the cellular communication devices 303. For example, the data synchronization module 203 is configured to detect that a contact application has changed contacts data, that a calendar application has changed calendar data, that a mapping application has changed mapping data (e.g., a user has looked up a direction between a new origin and/or destination), that a navigation application has changed navigation data (e.g., a target destination), or that a game application has changed game data (e.g., the level at which the user is playing).

To facilitate this detection, the applications that are running in the cellular communication devices may be configured to deliver any changed data to the data synchronization module 203 through the cellular network communication system 117 at the time the changes are made, in accordance with a schedule, or on command of a user. The data synchronization module 203 may in addition or instead be configured to query each cellular communication device about changed data when the device is active. Again, this may be done in accordance with a schedule or on user demand. A schedule may be based on the time sensitive nature of the information and/or the resources needed to provide the update. For example, changes to mapping data may be considered highly time sensitive, requiring quick updates, while changes to contact information might be regarded as less time sensitive, not requiring quick updates. In one example, the user is able to configure the system through a user settings interface to provide data synchronization between multiple devices in real time (the system pushes the data whenever there is data change detected) or in a periodic fashion (in which case synchronization occurs only a limited number of times a day). In another example, the user is able to manually activate synchronization (i.e., synchronization is on-demand). The available options in user configuration are controlled by a service pricing model based on the level of system usage and service convenience. The data synchronization module 203 may in addition or instead be configured to synchronize data upon demand from the entity using the cellular communication devices or some other entity if permitted.

After detecting that an application has changed data, the data synchronization module 203 is configured to consult the data storage system 211 to determine whether the application that changed the data was also delivered to one or more other cellular communication devices within the same entity group. The data synchronization module 203 may be configured to make this determination by consulting the information about delivered applications 305. If the data synchronization module 203 determines that the application was also delivered to other cellular communication devices within the same entity group, the data synchronization module 203 is configured to cause the changed data to be propagated to the other cellular communication devices within the same entity group.

The data synchronization module 203 may use any means to propagate this changed data. Communications between the two make take place over a cellular network communication system, the Internet, one or more other types of communication systems, or a combination of these. The data synchronization module 203 may be configured to obtain the changed data from each application that changes data and to store this changed data in the data storage system 211. For example, changed contact data may be stored as part of the contacts data 401, changed calendar data may be stored as part of the calendar data 403, changed mapping data may be stored as part of the maps data 405, and changed navigation data may be stored as part of the navigation data 407.

The most current version of the data may be stored in the data storage system 211 as the changed data 217. Each time the changed data 217 is updated, the data synchronization module 203 is configured to deliver the updated data (or the latest version of all of the data) back to the other cellular communication devices within the same entity group. The data synchronization module 203 may be configured to defer the delivery of this changed data to a particular cellular communication device until after that particular cellular communication device is active and thus able to receive the changed data. The data synchronization module 203 may be configured to push the changed data to the cellular communication device after it becomes active, in accordance with a schedule, and/or an application within the cellular communication device may be configured to query the data synchronization module 203 for the changed data. These pushes and/or pulls may be configured to take place upon request by a user, on a periodic basis, immediately when data is changed (when possible), and/or on any other basis. Whether a push or pull is used may depend on a variety of factors. For example, time sensitive data and higher requested or desired levels of service may favor a push approach.

The specific steps that are followed to provide the updates may depend on the application, the updated data, and/or the communication system that is being used. Updates may include information such as a device ID, an account ID, an application ID, and the data to be synchronized.

Some applications may utilize a back-end server for support. In this case, the back-end server may be configured to perform functions of the multi-device application distribution, synching, and notification routing system 119, such as the functions that are performed by the data synchronization module 203. The back-end system may also be configured to store the information about the cellular communication device groups 213 and/or the information about changed data 217.

A mobile navigation application is an example of such an application. It normally uses a back-end server for maps and routing. These servers can be modified and extended to provide synchronization between multiple devices within the same group.

When synchronization contacts and address book applications, changes made on one device may be sent through the network immediately to the other devices within the same group. For map and navigation applications, a user may be able to map a location and get driving directions on a tablet device and then have the information pushed to a handset. When the user switches to the handset, the user will be able to find the same destination and directions already synchronized to the handset so the user can immediately select to start navigation.

As indicated above, user-specified options may be stored in the user-specified options 309 that specify which cellular communication devices and/or which applications within each entity group should be updated with changed data. In such a case, the data synchronization module 203 would be configured to provide these updates in accordance with these user-specified options 309.

The notification routing module 205 is configured to detect a notification that is directed to at least one of the cellular communication devices 303. Such a notification, for example, may be a notification of an email, text message, or telephone call that has just arrived.

Any technology may be employed by the notification routing module 205 to detect such a notification. For example, the cellular network communication system 117 may be configured to provide the notification routing module 205 with all such notices.

The notification routing module 205 is configured to contemporaneously determine which cellular communication device is active within the group of cellular communication devices to which the notification is directed, and to route the notification to the active cellular communication device. The active device may or may not be the device to which the notification is directed.

For example, the notification routing module 205 may receive notice that an instant message is being sent to one of the cellular communication devices 303, but that this device is not active. The notification routing module 205 is configured to determine whether any of the other cellular communication devices within the same entity group is active and, if so, to direct notice of the instant message to the other active device. The notification routing module 205 may also be configured to direct the content of the instant message or other related information to the device as well.

When notifications concern information, the data synchronization module 203 may be configured to treat such information as changed data and to propagate this changed data to other devices within the group in accordance with the technologies and procedures discussed above.

Any technological means may be employed to provide the notification routing module 205 with information about which cellular communication devices are active. For example, the cellular network communication system 117 may be configured to detect this information and to provide it to the notification routing module 205.

As explained above, the user-specified options 309 may contain user-specified options indicating which cellular communication devices in each entity group the notification routing module 205 should route the notifications too, in addition to the active cellular communication device in the group. In such a case, the notification routing module 205 is configured to route the notification to such other cellular communication devices as well. As also indicated above, the user-specified options 309 may include options indicating which types of notifications in each group should be subject to the active device notification routing provided by the notification routing module 205. In such a case, the notification routing module 205 is configured to route the notifications in accordance with these user-specified options.

For example, a user may be working on his tablet while receiving an SMS message on his handset, which may be remote from the user. The notification routing module 205 may cause the SMS message to be routed to his tablet so it will essentially immediately come to the user's attention.

The multi-device application distribution, syncing, and notification routing system that has been discussed, as well as each of its components, is implemented with one or more computer systems configured to perform the functions that have been described herein for the component. The computer systems includes one or more processors, memory devices (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens). The computer systems may include one or more computers at the same or different locations. When at different locations, the computers may be configured to communicate with one another through a wired and/or wireless network communication system.

The computer systems may include software (e.g., one or more operating systems, device drivers, application programs, and/or communication programs). When software is included, the software includes programming instructions and may include associated data and libraries. When included, the programming instructions are configured to implement one or more algorithms that implement one more of the functions of the computer system, as recited herein. Each function that is performed by an algorithm also constitutes a description of the algorithm. The software may be stored on one or more non-transitory, tangible storage devices, such as one or more hard disk drives, CDs, DVDs, and/or flash memories. The software may be in source code and/or object code format. Associated data may be stored in any type of volatile and/or non-volatile memory.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases in a claim mean that the claim is not intended to and should not be interpreted to be limited to any of the corresponding structures, materials, or acts or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

The invention claimed is:

1. An application data synchronization system comprising:
   a data storage system configured to store, for each respective one of a plurality of entities:
      an identity of the respective entity;
      an identity for each of a plurality of cellular communication devices forming a group of cellular communication devices used by the respective entity; and
      an identity for an application that has been delivered to at least two of the cellular communication devices in the group of cellular communication devices used by the respective entity; and
   a data synchronization module comprising a computer, including a processor, a memory, and software to configure the computer of the data synchronization module to, for each of the plurality of entities:
      detect that one of a plurality of applications resident on a cellular communication device of the group of cellular communication devices used by the respective entity has changed data while operating in the cellular communication device;
      compare, based at least in part on the identity of the respective entity, an identity of the one application that changed data with the identity for the application that has been delivered to at least two of the cellular communication devices, as stored in the data storage system, to determine whether a match exists; and
      upon a determination that the identity of the one application that changed data matches the identity for the application that has been delivered to at least two of the cellular communication devices, cause the changed data to be propagated only to the one or more other cellular communication devices within the group used by the respective entity to which the one application that changed the data was delivered.

2. The application data synchronization system of claim 1 wherein the software further configures the data synchronization module to cause the changed data to be propagated on demand.

3. The application data synchronization system of claim 1 wherein the software further configures the data synchronization module to cause the changed data to be propagated on a periodic schedule.

4. The application data synchronization system of claim 1 wherein the data storage system is configured to store, for each respective one of the plurality of entities, the data that is changed by applications operating in cellular communication devices within the group used by the respective entity.

5. The application data synchronization system of claim 1 wherein the at least one application comprises a contacts application and the changed data is contact data.

6. The application data synchronization system of claim 1 wherein the at least one application comprises a calendar application and the changed data is calendar data.

7. The application data synchronization system of claim 1 wherein the at least one application comprises a map application and the changed data is mapping data.

8. The application data synchronization system of claim 1 wherein the at least one application comprises a navigation application and the changed data is navigation data.

9. The application data synchronization system of claim 1 further comprising a user interface configured to allow each entity to change the group of cellular communication devices used by the entity stored in the data storage system.

10. The application data synchronization system of claim 1 wherein:
   the data storage system is configured to store, for each respective one of the plurality of entities, user-specified options indicating to which cellular communication devices within the group used by the respective entity the data synchronization module should propagate changed data;
   the application data synchronization system includes a user interface configured to receive the user-specified options, which are subsequently stored in the data storage system; and
   the software further configures the data synchronization module to propagate changed data in conformance with the user-specified options.

11. The application data synchronization system of claim 1 wherein:
   the data storage system is configured to store, for each respective one of the plurality of entities, user-specified options indicating which applications operating in the cellular communication devices within the group used by the respective entity are to be subject to data synchronization;
   the application data synchronization system includes a user interface configured to receive the user-specified options, which are subsequently stored in the data storage system; and
   the software further configures the data synchronization module to propagate changed data in conformance with the user-specified options.

12. The application data synchronization system of claim 1 further comprising a notification routing module comprising a computer, including a processor, a memory, and software to configure the computer of the notification routing module to, for each of the plurality of entities:
   detect a notification that is directed to at least one of the cellular communication devices within the group used by the respective entity;
   determine which cellular communication device(s) is or are active within the group used by the respective entity; and
   route the notification to the active cellular communication device(s) within the group used by the respective entity.

13. The application data synchronization system of claim 1 wherein:
   the data storage system is configured to store, for each respective one of the plurality of entities, an identity of an application or a unit of content that has been delivered to at least one of the cellular communication devices in the group used by the respective entity; and
   the application data synchronization system further comprises:
      an application or content delivery module comprising a computer, including a processor, a memory, and software to configure the computer of the application or content delivery module to deliver a requested application or unit of content to a requesting cellular communication device in response to a request for such delivery from the requesting cellular communication device; and
      a multiple-delivery benefit determination module comprising a computer, including a processor, a memory, and software to configure the computer of the multiple-delivery benefit determination module to:
         determine whether the requested application or unit of content had previously been delivered to a cellular communication device within the group containing the requesting cellular communication device by consulting the data storage system; and provide a multi-delivery benefit if and only if the determination is that the requested application or unit of content had previously been delivered to a cellular communication device within the group containing the requesting cellular communication device by consulting the data storage system.

14. The application data synchronization system of claim 13 wherein the multi-delivery benefit in connection with at least one requested application or unit of content is a discount from the per-unit price of the application or unit of content.

15. The application data synchronization system of claim 13 wherein the multi-delivery benefit in connection with at least one requested application or unit of content is not to charge beyond what was charged for the delivery of the application or unit of content to the cellular communication device within the group to which the at least one requested application or unit of content had previously been delivered.

16. The application data synchronization system of claim 13 wherein the multi-delivery benefit is based on a stored benefit policy.

17. The application data synchronization system of claim 16 wherein the stored benefit policy is different for different applications or units of content.

18. A non-transitory, tangible, computer-readable medium containing a program of instructions configured to cause a computer system running the program of instructions to:
store, in a data storage system and for each respective one of a plurality of entities:
an identity of the respective entity;
an identity for each of a plurality of cellular communication devices forming a group of cellular communication devices used by the respective entity; and
an identity for at least one application that has been delivered to at least two of the cellular communication devices in the group of cellular communication devices used by the respective entity; and
for each of the plurality of entities:
detect that an application has changed data while operating in one of the cellular communication devices of the group of cellular communication devices used by the respective entity;
compare, based at least in part on the identity of the respective entity, an identity of the one application that changed data with the identity for the application that has been delivered to at least two of the cellular communication devices, as stored in the data storage system, to determine whether a match exists; and
upon a determination that the identity of the one application that changed data matches the identity for the application that has been delivered to at least two of the cellular communication devices, cause the changed data to be propagated only to the one or more other cellular communication devices within the group used by the respective entity to which the application that changed the data was also delivered.

19. A system comprising:
a computer system comprising:
a processor;
a memory coupled to the processor; and
data synchronization software stored in the memory;
a plurality of groups, each group being related to only one of a plurality of entities and each group comprising a plurality of cellular communication devices of the one related entity; and
a data storage system configured to store, for each group:
an identity for the one related entity;
an identity for each of the plurality of cellular communication devices forming the respective group; and
an identity for an application that has been delivered to at least two of the cellular communication devices of the respective group;
wherein execution of the data synchronization software by the processor of the computer system configures the computer system to implement functions, including functions to:
detect that one of a plurality of applications resident on a cellular communication device of one of the groups has changed data while operating in the cellular communication device;
compare, based at least in part on the identity of the respective entity, an identity of the one application that changed data with the identity for the application that has been delivered to at least two of the cellular communication devices, as stored in the data storage system, to determine whether a match exists; and
upon a determination that the identity of the one application that changed data matches the identity for the application that has been delivered to at least two of the cellular communication devices, cause the changed data to be propagated only to the one or more other cellular communication devices of the respective group to which the one application that changed the data was delivered.

20. The system of claim 19, further comprising:
an application or content delivery computer system comprising:
a processor;
a memory coupled to the processor; and
application or content delivery software stored in the memory; and
a multiple-delivery benefit determination computer system comprising:
a processor;
a memory coupled to the processor; and
multiple-delivery benefit determination software stored in the memory;
wherein:
the data storage system is further configured to store, for each group, an identity of an application or a unit of content that has been delivered to at least one of the cellular communication devices of the group;
execution of the application or content delivery software by the processor of the application or content delivery computer system configures the application or content delivery computer system to implement functions, including a function to:
deliver a requested application or unit of content to a requesting cellular communication device in response to a request for such delivery from the requesting cellular communication device; and
execution of the multiple-delivery benefit determination software by the processor of the multiple-delivery benefit determination computer system configures the multiple-delivery benefit determination computer system to implement functions, including functions to:
determine whether the requested application or unit of content had previously been delivered to a cellular communication device of the group containing the requesting cellular communication device by consulting the data storage system; and
provide a multi-delivery benefit if and only if the determination is that the requested application or unit of content had previously been delivered to a cellular communication device of the group containing the requesting cellular communication device by consulting the data storage system.

* * * * *